US010924354B2

(12) United States Patent
Takahashi et al.

(10) Patent No.: US 10,924,354 B2
(45) Date of Patent: Feb. 16, 2021

(54) DETECTION OF A BOTTLENECK IN A MESSAGE FLOW BETWEEN ASSOCIATED SERVERS

(71) Applicant: INTERNATIONAL BUSINESS MACHINES CORPORATION, Armonk, NY (US)

(72) Inventors: Koichi Takahashi, Edogawa (JP); Takayuki Kushida, Machida (JP)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 16/514,700

(22) Filed: Jul. 17, 2019

(65) Prior Publication Data
US 2021/0021478 A1     Jan. 21, 2021

(51) Int. Cl.
*H04L 12/24*     (2006.01)
*H04L 29/08*     (2006.01)

(52) U.S. Cl.
CPC .............. *H04L 41/14* (2013.01); *H04L 67/10* (2013.01)

(58) Field of Classification Search
CPC ......... H04L 41/14; H04L 67/10; H04L 41/00; G06F 11/3447
See application file for complete search history.

(56) References Cited

U.S. PATENT DOCUMENTS

| 6,067,412 A | 5/2000 | Blake et al. |
| 6,609,083 B2 | 8/2003 | Enck et al. |
| 9,207,984 B2 | 12/2015 | Sivasubramanian et al. |
| 2006/0190596 A1 | 8/2006 | Horikawa |
| 2006/0215552 A1* | 9/2006 | Iwata ...................... H04L 41/00 370/229 |
| 2010/0268816 A1 | 10/2010 | Tarui et al. |
| 2011/0154340 A1* | 6/2011 | Kanemasa .......... G06F 11/3447 718/100 |
| 2013/0116976 A1 | 5/2013 | Kanemasa et al. |
| 2016/0182328 A1 | 6/2016 | Bhasin et al. |

* cited by examiner

*Primary Examiner* — Soe Hlaing
(74) *Attorney, Agent, or Firm* — Konrad Raynes Davda & Victor LLP; Janaki K. Davda

(57) ABSTRACT

Provided are techniques for identifying a server from a plurality of servers causing a bottleneck in a system. Message processing information about message processing performed by one of the plurality of servers is provided. An input is received indicating an adjustment to a number of messages input to the one of the plurality of servers. A message is sent causing the one of the plurality of servers to adjust a number of input messages based on the adjusted number of messages. Updated message processing information is received for the number of messages in the adjusted number of input messages that indicates a number of messages processed per unit time. In response to determining that the number of messages processed does not change in response to the adjustment to the amount of messages input, the one of the plurality of servers is identified as causing the bottleneck in the system.

20 Claims, 13 Drawing Sheets

DETECTION OF A BOTTLENECK IN A MESSAGE FLOW BETWEEN ASSOCIATED SERVERS

BACKGROUND

1. Field of the Invention

Embodiments of the invention relate to detecting a server causing a bottleneck in a message flow between associated servers.

2. Description of the Related Art

In many systems, multiple servers pass messages from a first server to a last server in an ordered fashion to perform a task. For example, a Logging, Monitoring, and Alert (LMA) system has multiple servers relay log data between the servers in messages and store the messages in a database.

In such a system, a server with the worst performance typically dominates the overall system performance by creating a bottleneck that inhibits the other servers from performing at an optimum capacity. However, it may be difficult to identify which server processes a particular amount of messages without logging into each server to check the amount of messages processed. Typically, the way to determine a problematic server causing a bottleneck has been to access each server individually, obtain the performance data for each server, and compare the performance data from the various servers to determine the server that is causing the bottleneck.

SUMMARY

In accordance with embodiments, a computer-implemented method is provided for detecting a bottleneck in a message flow between associated servers. The computer-implemented method comprises operations. Message processing information about message processing performed by one of the plurality of servers is provided, in a display, where the plurality of servers in the system relay messages in an ordered manner from a first server to a last server; receiving an input via an input device from a user indicating an adjustment to a number of messages input to the one of the plurality of servers. A message is sent causing the one of the plurality of servers to adjust a number of input messages in a processing queue based on the adjusted number of messages. Updated message processing information for the number of messages in the adjusted number of input messages is received, where the updated message processing information indicates a number of messages processed per unit time. In response to determining that the number of messages processed does not change in response to the adjustment to the amount of messages input, the one of the plurality of servers is identified, in the display, as causing a bottleneck in the system.

In accordance with other embodiments, a computer program product is provided for detecting a bottleneck in a message flow between associated servers. The computer program product comprises a computer readable storage medium having program code embodied therewith, the program code executable by at least one processor to perform operations. Message processing information about message processing performed by one of the plurality of servers is provided, in a display, where the plurality of servers in the system relay messages in an ordered manner from a first server to a last server; receiving an input via an input device from a user indicating an adjustment to a number of messages input to the one of the plurality of servers. A message is sent causing the one of the plurality of servers to adjust a number of input messages in a processing queue based on the adjusted number of messages. Updated message processing information for the number of messages in the adjusted number of input messages is received, where the updated message processing information indicates a number of messages processed per unit time. In response to determining that the number of messages processed does not change in response to the adjustment to the amount of messages input, the one of the plurality of servers is identified, in the display, as causing a bottleneck in the system.

In yet other embodiments, a computer system is provided for detecting a message flow between associated servers. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Message processing information about message processing performed by one of the plurality of servers is provided, in a display, where the plurality of servers in the system relay messages in an ordered manner from a first server to a last server; receiving an input via an input device from a user indicating an adjustment to a number of messages input to the one of the plurality of servers. A message is sent causing the one of the plurality of servers to adjust a number of input messages in a processing queue based on the adjusted number of messages. Updated message processing information for the number of messages in the adjusted number of input messages is received, where the updated message processing information indicates a number of messages processed per unit time. In response to determining that the number of messages processed does not change in response to the adjustment to the amount of messages input, the one of the plurality of servers is identified, in the display, as causing a bottleneck in the system.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As discussed above, many systems include multiple servers that pass messages from a first server to a last server in an ordered fashion to perform a task. In such a system, a server with the worst performance typically dominates the overall system performance by creating a bottleneck that inhibits the other servers from performing at an optimum capacity.

In accordance with various embodiments, a server in a system that may be causing a bottleneck for the system is determined. Various embodiments of the disclosed system allow a user to view message processing information for a particular server and adjust an amount of input messages to the server in order to determine whether a change in the volume of input messages affects the message processing performed by the server. A server causing a potential bottleneck is identified by determining that an increase in messages does not change the message processing information and/or causes an error in the server. The message processing information for the server may be displayed, as well as, an indication that the server is a potential bottleneck in response to a determination that an increase in messages does not change the message processing information or causes an error.

In some embodiments, the system may adjust the input messages for each of the servers in a group of servers in an ordered fashion to determine the one or more servers in the group that may be a potential cause of a bottleneck. Various embodiments for identifying a server causing a bottleneck are described below with references to the Figures.

Figure 1:
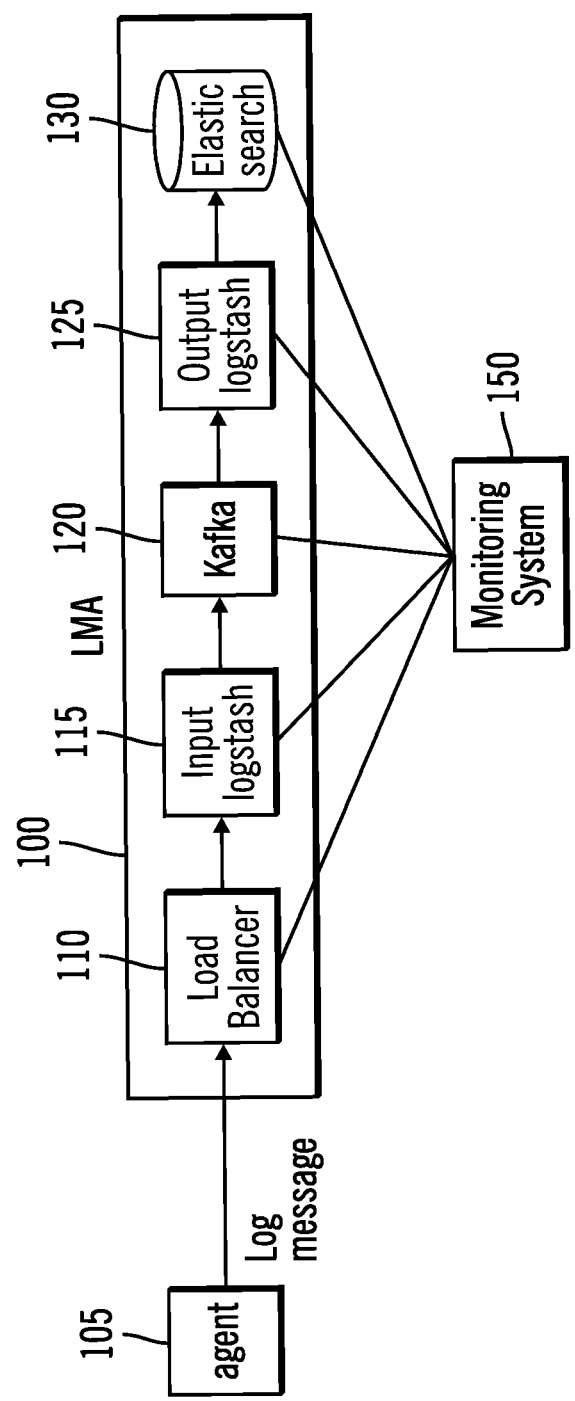
FIG. 1 illustrates, in a block diagram, an LMA system in accordance with certain embodiments.

An example of a system that includes servers that relay messages in an ordered fashion from a first server to a last server in accordance with an embodiment of the disclosure is illustrated in FIG. 1. Logging, Monitoring, and Alert (LMA) system 100 is a system that includes load balancer server 110, input logstash server 115, application server 120, output logstash server 125 and database 130. LMA system 100 receives messages from an agent device 105.

In LMA system 100, the servers relay an input message from a first server to a last server in an ordered manner. In the shown embodiment, load balancer server 110 receives the message from agent device 105 and provides the message to input logstash server 115. Input logstash server 115 receives the message from load balancer server 110 and relays the message to application server 120. Application server 120 receives the message from input logstash server 115 and relays the message to output logstash server 125. Output logstash server 125 provides the message to the database 130 that stores the message for future use. In system 100, the server that processes the messages the slowest creates a bottle neck as the messages cannot be relayed to subsequent servers without passing through the slowest server.

Monitoring system 150 is a processing system that communicatively connects via a network or some other connection to the servers in LMA system 100 to perform diagnostic functions on the servers and monitor the operational parameters of each server. For example, monitoring system 150 may obtain message processing information from each of the servers in LMA system 100 and generate displays showing the message processing information. The message processing information includes information relevant to the processing of messages in each of the servers and may include, but is not limited to, the number of messages processed by the system per a specified period of time.

Although a block diagram of LMA system is shown in FIG. 1, it is understood that only the systems needed to understand a message flow through LMA system are shown and that LMA system 100 may include other systems and components that are omitted for brevity and clarity.

Figure 2:
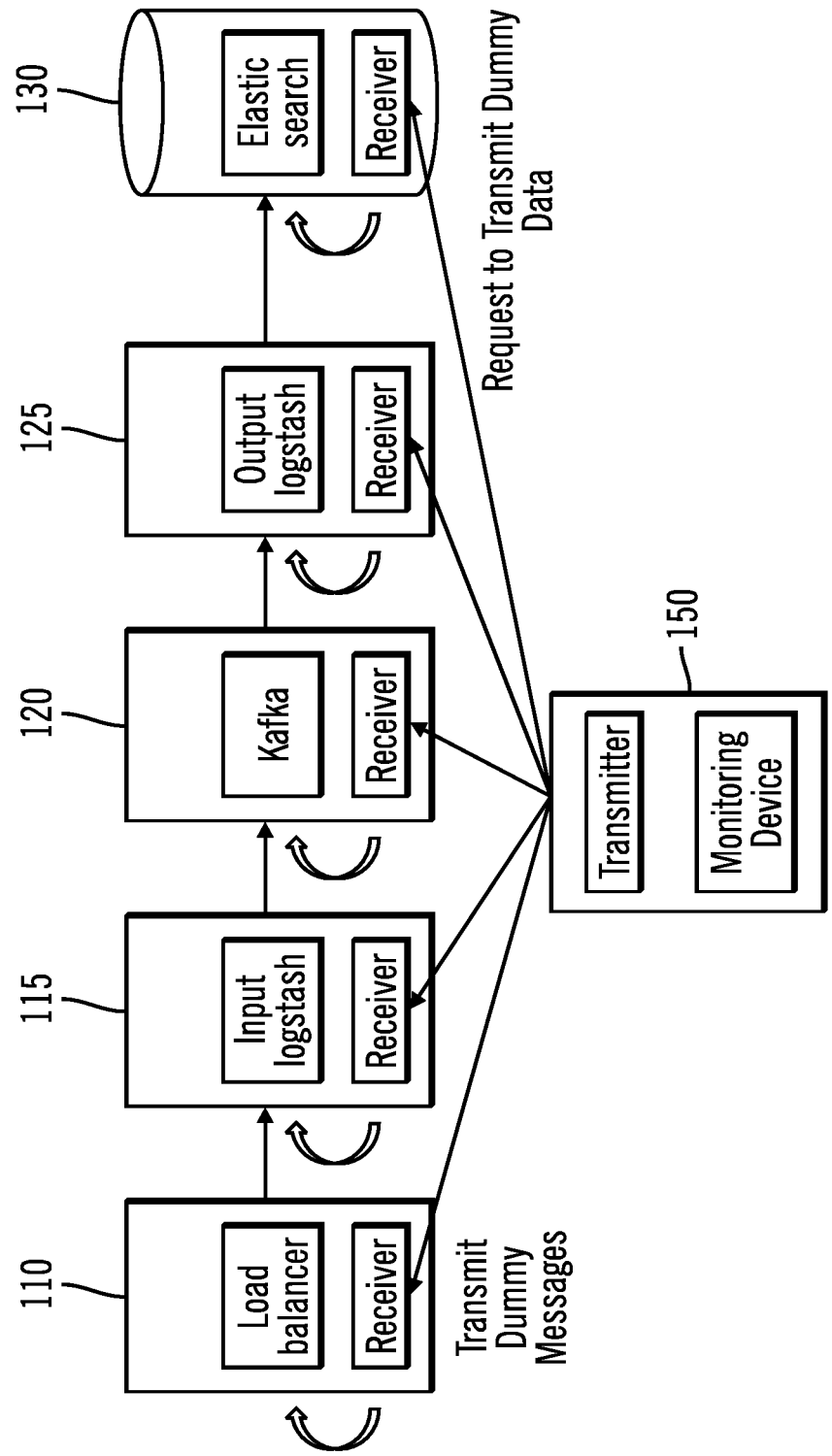
FIG. 2 conceptually illustrates, in a block diagram, a monitoring device transmitting requests to generate dummy messages to servers in an LMA system.
Figure 3:
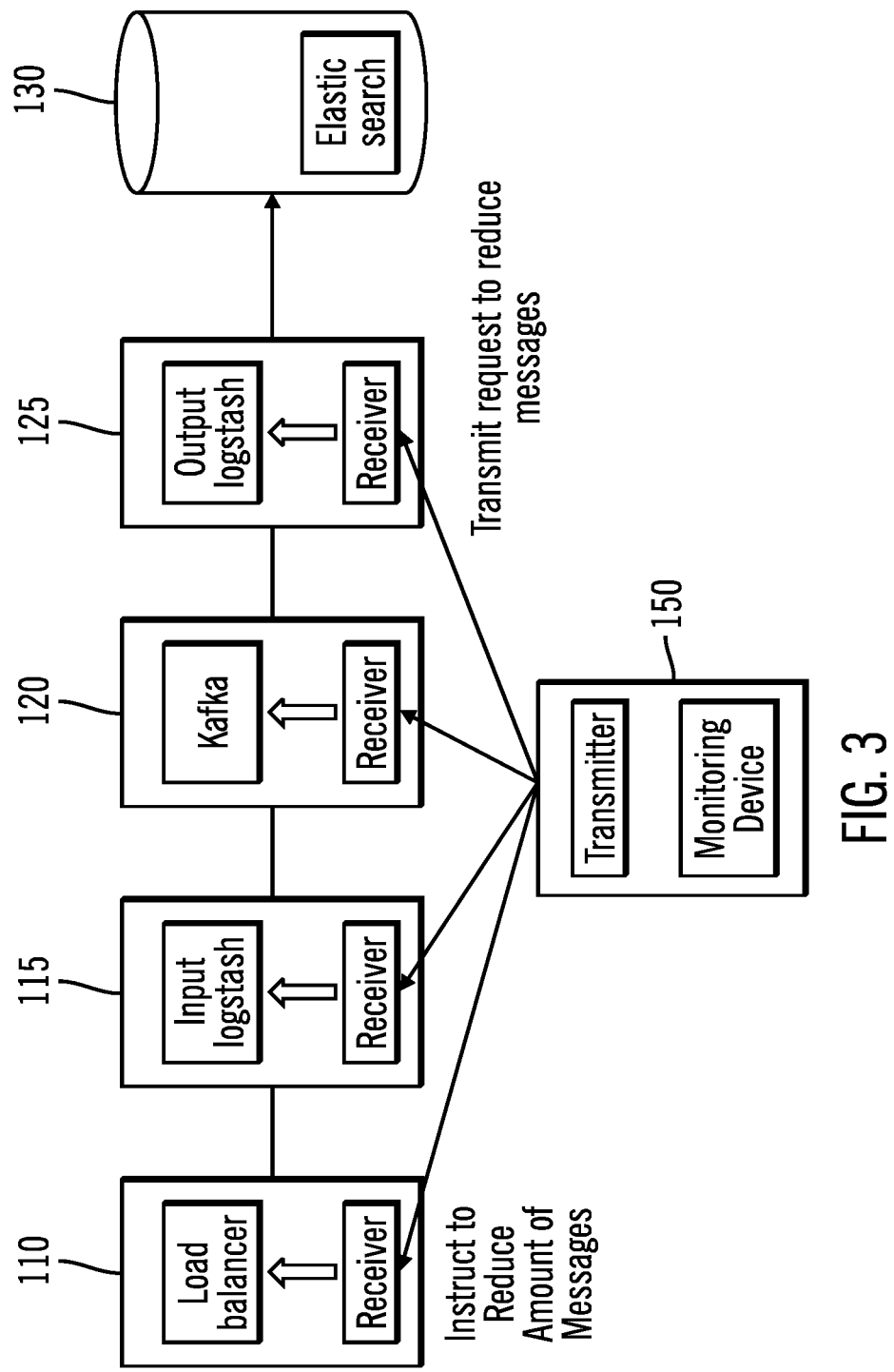
FIG. 3 conceptually illustrates, in a block diagram, a monitoring device transmitting requests to reduce the input messages to servers in an LMA system.

FIGS. 2 and 3 conceptually illustrate that the monitoring system 150 transmits messages to the servers 110, 115, 120, and 125 messages to change the amount of input messages to a particular server. In FIG. 2, monitoring system 150 is a transmitter that transmits a message to cause the servers to generate dummy messages to increase the amount of input messages to the server. FIG. 3 shows that monitoring system 150 is a transmitter that transmits a message to one or more of the servers 110, 115, 120, and 125 to reduce the number of input messages to a particular server. These messages to reduce or increase the number of input messages to a server are used in processes to identify a server that may be the cause of a bottle neck in the processes described below.

Figure 4:
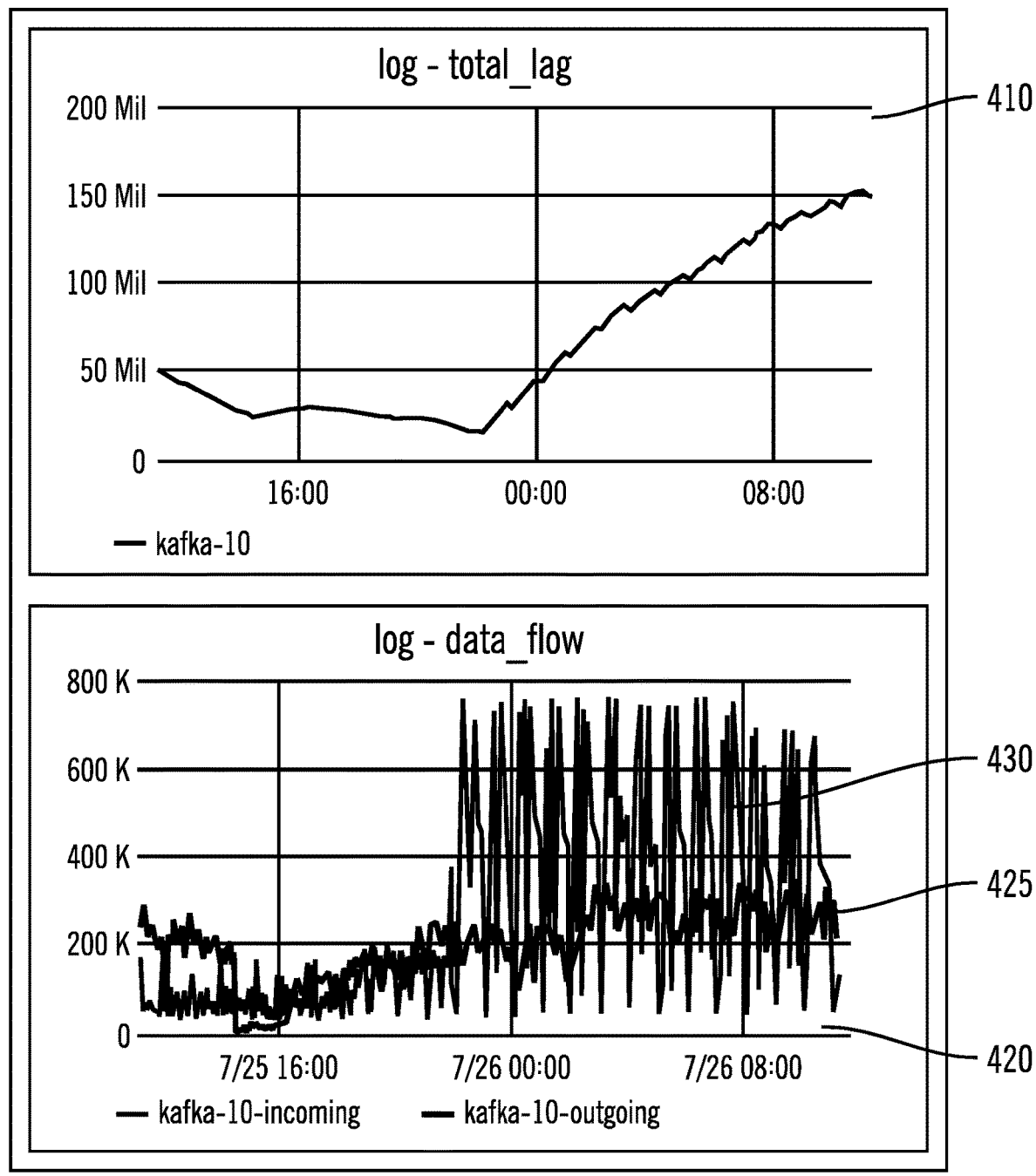
FIG. 4 illustrates a display of message processing information in accordance with certain embodiments.
Figure 5:
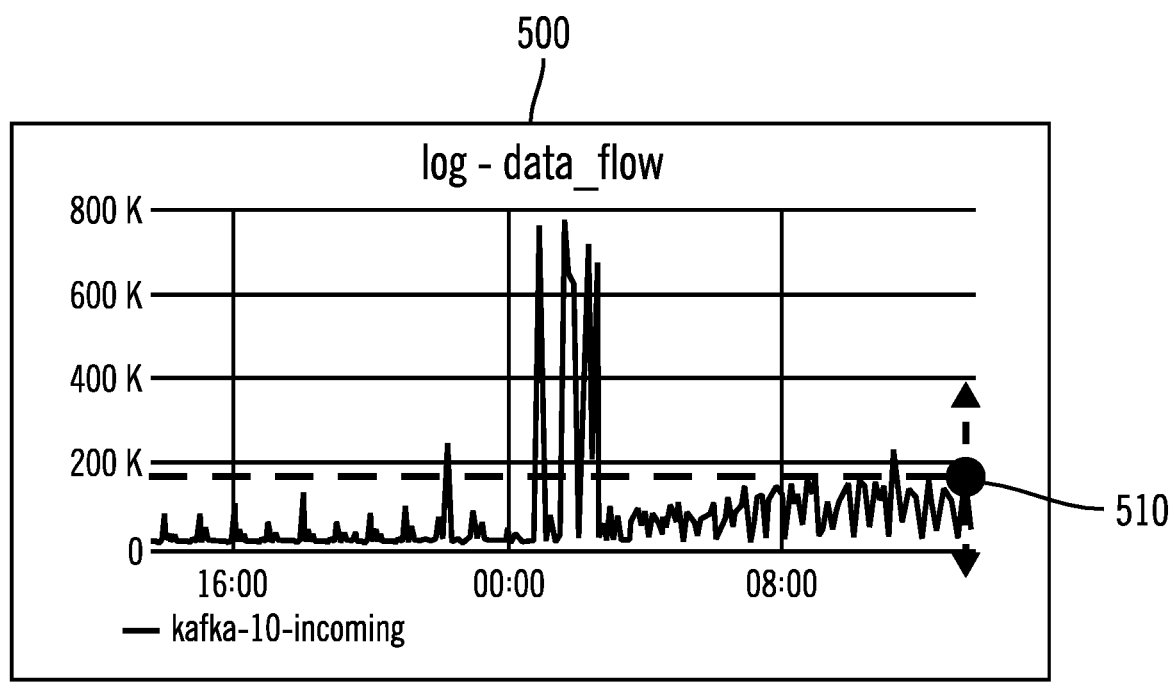
FIG. 5 illustrates a display of message processing information with a maximum for input messages in accordance with certain embodiments.
Figure 6:
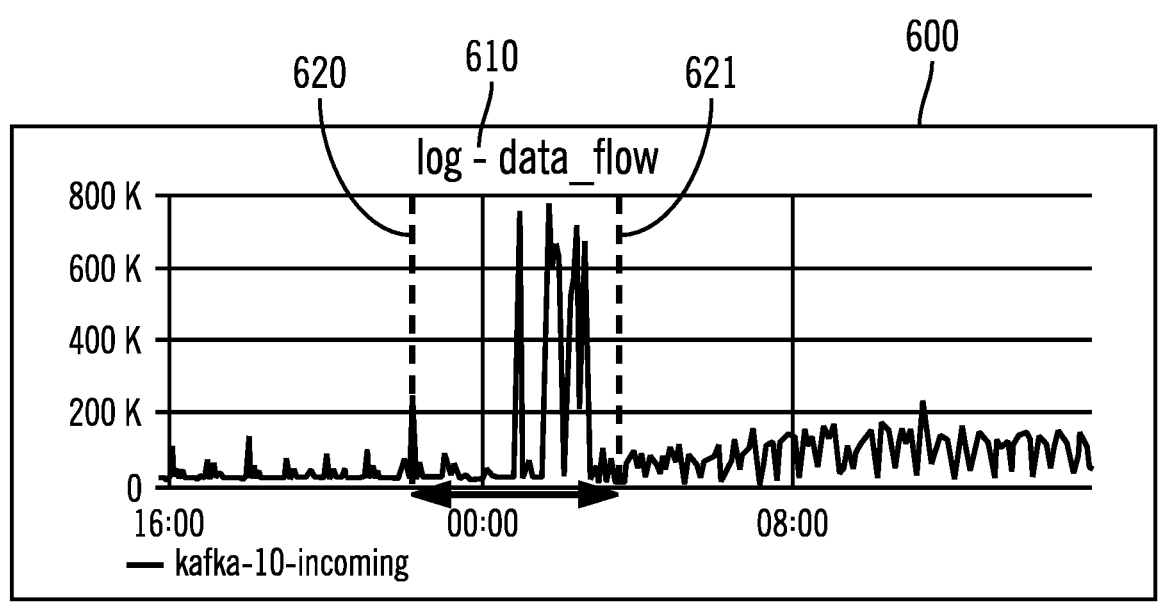
FIG. 6 illustrates a display indicating a time period for which an incoming message amount is to be duplicated in accordance with certain embodiments.

In some of the described embodiments, a user may view message processing information for a particular server on a display associated with a monitoring system and use an input device to input an adjustment to an amount of input messages to the particular server. FIGS. 4-6 illustrate various Graphical User Interfaces (GUI)s that may be used to view message processing information for a server and be used to adjust the number of incoming messages to the particular server.

FIG. 4 illustrates a lag display 410 that shows the lag time compared to a number of messages processed (with the x-axis showing time and the y-axis showing number of messages). FIG. 4 also shows a message flow display 420 that shows the number of input messages in an incoming queue 430 divided by the number of outgoing messages in an outgoing queue 425 (number of incoming messages/number of outgoing messages on the x-axis) over an extended period of time (on the y-axis).

FIG. 5 illustrates a display 500 in which a user may input a line 510 to indicate a particular number of input messages to be handled by the monitored server. In FIG. 5, an amount of data is specified on the display 500. Then, data may be removed or added to adjust the amount of data to a specified amount of data. In certain embodiments, a range defined by upper and lower limits may be specified, and the amount of data is gradually increased or decreased within the range.

FIG. 6 illustrates a display 600 in which a user adds lines 620 and 621 to indicate a time period over which the message input to the monitored server is to be replicated. In this example, the display 600 is configured to specify a time period in the past and to reproduce the amount of data in the time period.

The above describes GUIs that may be used to adjust the number of incoming messages handled by embodiments of the invention. However, other GUIs and other manners of input may be used in various other embodiments.

Figure 7:
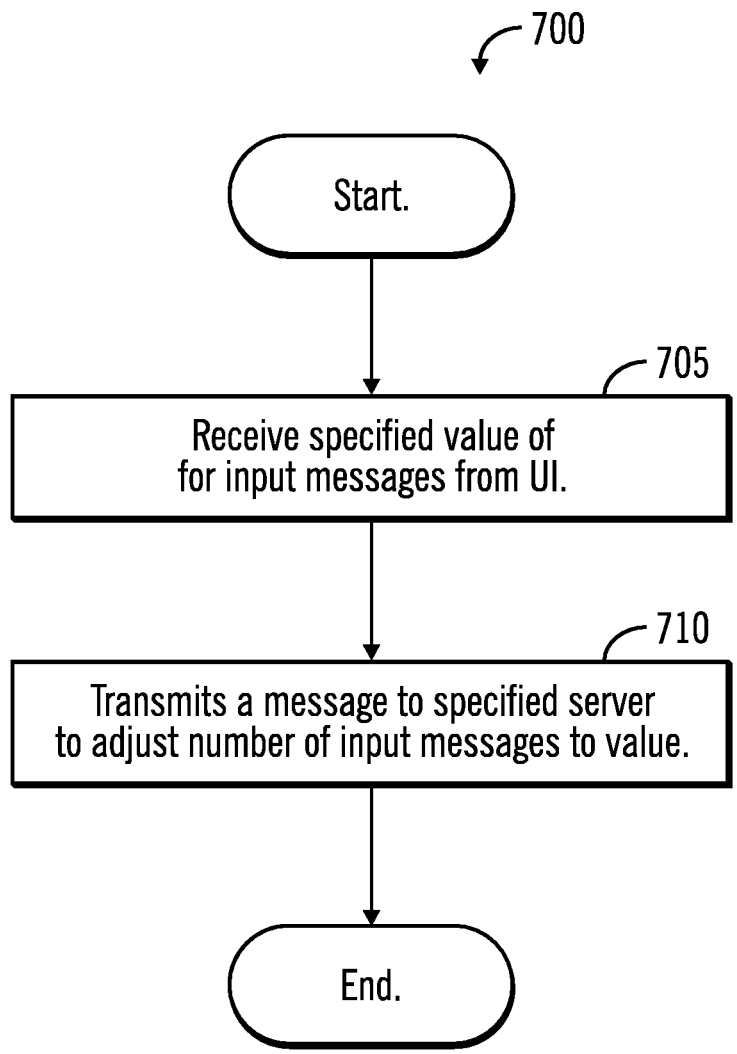
FIG. 7 illustrates, in a flow diagram, a process performed by a monitoring device to change an amount of input messages to a server in accordance with some embodiments.

In accordance with some embodiments, a monitoring system 150 changes the number of incoming messages to a server 110, 115, 120, and/or 125 based upon an input received from a user to allow the user to test in order to determine whether the server may be a cause of a bottleneck. A process performed by a monitoring system 150 to change the amount of incoming messages to a server 110, 115, 120, and/or 125 is illustrated in FIG. 7. In process 700, the monitoring system 150 receives a specified value for the number of incoming messages for a server 110, 115, 120, and/or 125 input by a user using a Graphical User Interface (GUI) (705). In response to receiving the specified value, the monitoring system 150 transmits a message to the server 110, 115, 120, and/or 125 that causes the server 110, 115, 120, and/or 125 to adjust the number of incoming messages to the specified value (710) and process 700 ends.

Although a process performed by a monitoring system 150 to change the amount of incoming messages in accordance with an embodiment is described, other processes that add, combine, and/or remove the described steps are possible in accordance with other embodiments.

Figure 8:
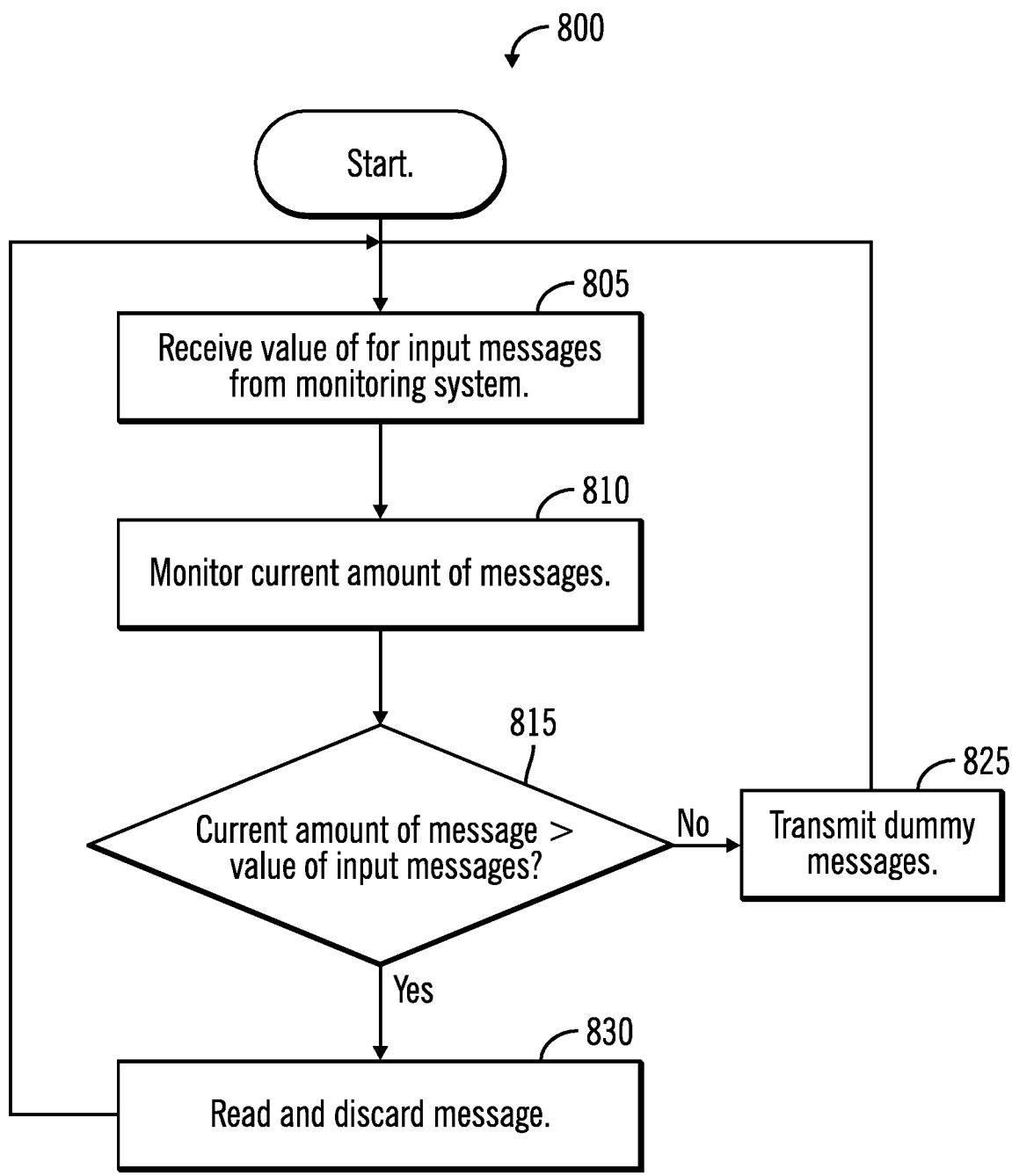
FIG. 8 illustrates, in a flow diagram, a process performed by a server to adjust the amount of incoming messages in accordance with some embodiments.

In response to receiving the message, a server 110, 115, 120, and/or 125 adjusts the number or amount of incoming messages to the specified value. FIG. 8 illustrates a process performed by server 110, 115, 120, and/or 125 to adjust the amount of incoming messages in accordance with an embodiment. In process 800, the server 110, 115, 120, and/or 125 receives the specified value from the monitoring system 150 (805). The server 110, 115, 120, and/or 125 monitors the amount of incoming messages received and/or stored by the server (810). The server 110, 115, 120, and/or 125 determines whether the specified value for incoming messages is greater than the actual number of incoming messages (815). If the actual number of messages is not greater than the specified value, the server 110, 115, 120, and/or 125 transmits dummy messages to increase the number of incoming messages (825). If the actual number of incoming messages is greater than the specified value, the server 110, 115, 120, and/or 125 reads and discards some incoming messages to reduce the number of incoming messages to the specified value (830).

Although a process performed by a server 110, 115, 120, and/or 125 to change the amount of incoming messages in accordance with an embodiment is described, other processes that add, combine, and/or remove the described steps are possible in accordance with other embodiments.

Figure 9:
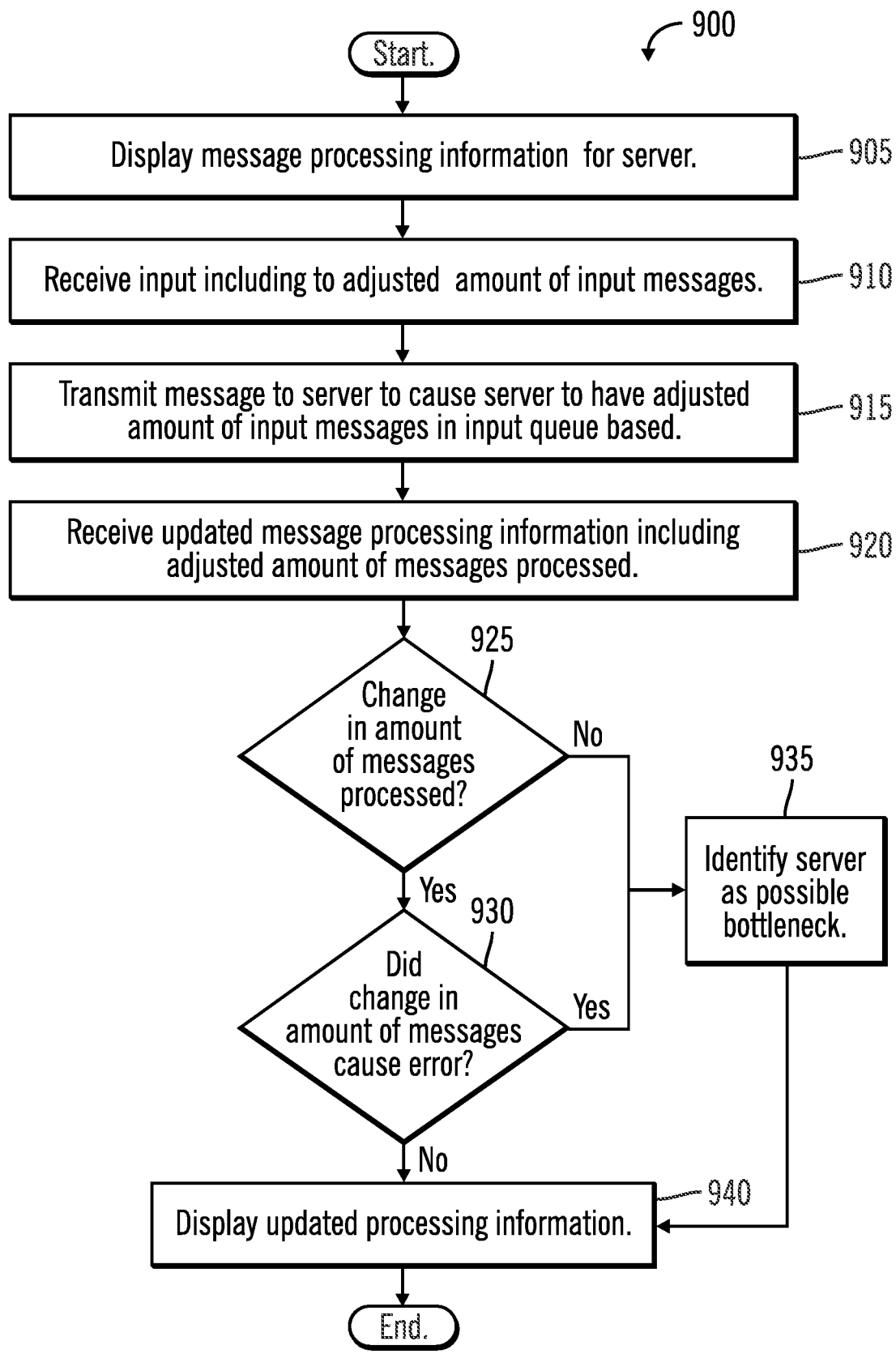
FIG. 9 illustrates, in a flow diagram, a process for determining whether a server from an associated group of servers is a potential bottleneck in a message flow between the servers in the group.

The above described GUIs show how message processing information may be viewed and how an adjustment to the amount of input messages to a server may be input. Based on the processes described above, it is possible to test each server 110, 115, 120, and/or 125 individually to determine whether a particular server may be the cause of a bottleneck. FIG. 9 illustrates a flow diagram of a process performed by the monitoring system 150 for detecting a server causing a possible bottleneck in a system by varying the amount of input messages to the server in accordance with certain embodiments of the invention.

In process 900, the monitoring system 150 displays message processing information for a particular server in the servers of the system being monitored (905). The display may be similar to those displays described above with reference to FIG. 4. A user operator may review the message processing information for the server and decide to change the amount of input messages to the server to observe the effects of the change in amount on the message processing information. The user operator may enter input message adjustment information using an input device of the monitoring system. The monitoring system receives the input of the adjusted amount of input messages (910).

The monitoring system 150 generates and transmits a message to the server that causes the server to adjust the amount of input messages in an input queue to the adjusted amount of input messages (915). In some, embodiments the message includes the adjusted amount of input messages and the server adjusts the number of messages accordingly. In some other embodiments, the monitoring system 150 determines whether the number of messages currently in the input queue needs to be increased or decreased and directs the server accordingly. If the amount of input messages is to be reduced, the monitoring system 150 may send a message that causes the server to re-write a configuration file to discard some messages accordingly in some embodiments. If the amount of input message is to increases, the monitoring system 150 determines the amount of input messages is to be increased and directs the server to generate dummy messages. In some other embodiments, the monitoring system 150 may generate and transmit the dummy messages to the server. In still other embodiments, the monitoring system 150 may direct another device, such as agent device 105, to generate the dummy messages and transmit the generated messages to the server.

In response to sending the message(s) that cause the server to adjust the amount of input messages, the monitoring system 150 receives updated message processing information based on the processing of the adjusted number of incoming messages (920). The monitoring system 150 determines whether the updated processing information indicates a change in the number of messages processed (925) or causes an error condition in the server (930). If either the number of messages processed does not changes as the number of messages increase or an error condition occurs, the server is identified as a possible cause of a bottle neck (930). The updated processing information and an indication that the server is a possible bottle neck is displayed (935) and process 900 ends.

If the amount of message processed does change and/or there is no error condition, the updated processing information is displayed (935) and process 500 ends.

A process for determining whether a server is a potential cause of a bottleneck in a system in accordance with an embodiment is described above with reference to FIG. 9.

However, other processes that add, remove, and/or combine steps of the described process are possible in accordance with other embodiments.

The process 900 allows a monitoring system 150 to measure a message processing amount of each server independently without making the server being tested cooperate with other systems. The process 900 also allows the monitoring system 150 to measure the message processing amount of each server independently. Still further, process 900 allows for, through a UI, measuring the message processing amount of each server in a group of servers that cooperate with each other, and thus is more convenient. In addition, the integrated performance of servers in cooperation is often different from the sum of the performance of independently operating servers. Therefore, it is meaningful to measure the integrated performance of servers that are made to cooperate with each other.

Figure 10:
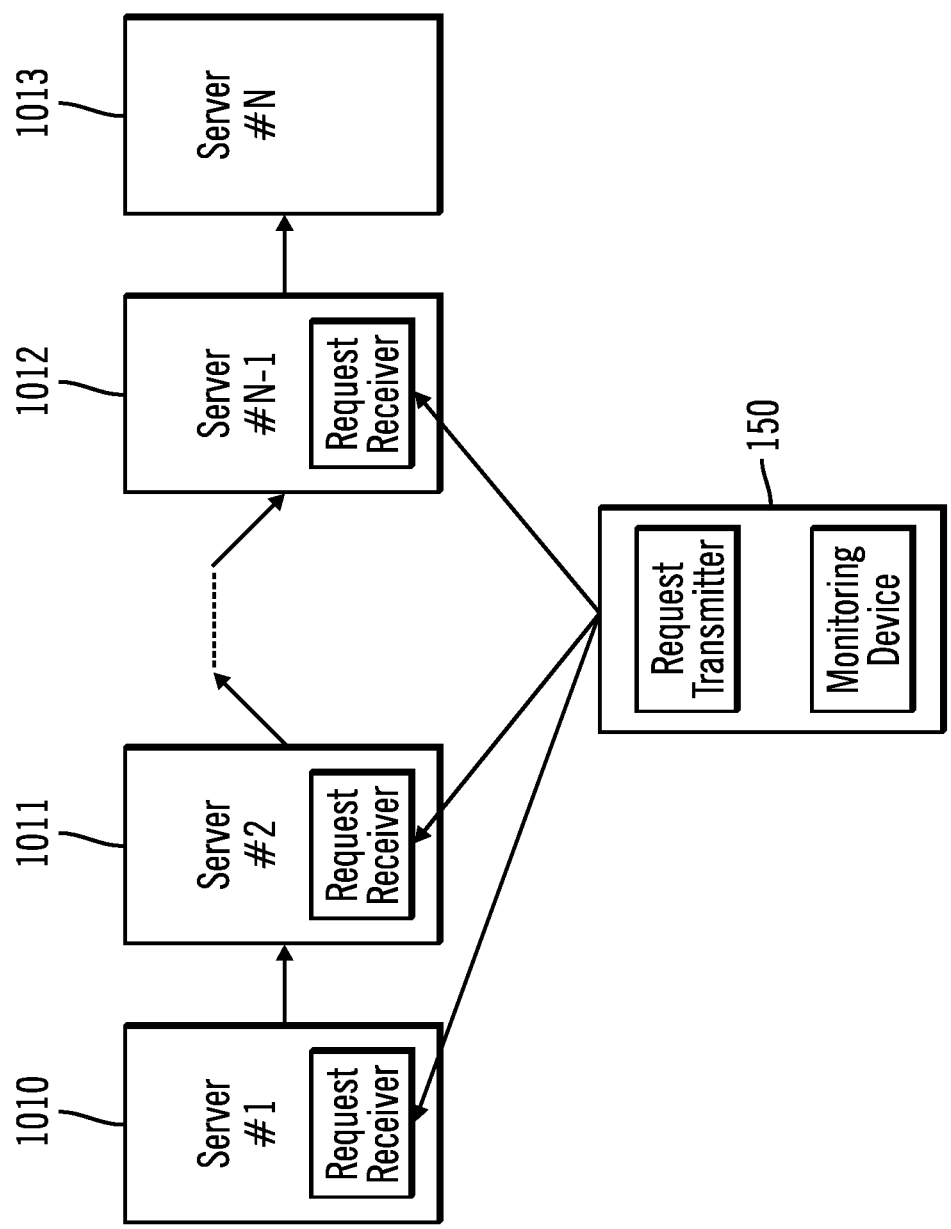
FIG. 10 illustrates, a group of servers that relay messages in an ordered fashion from a first server to a last server that is being monitored by a monitoring device in accordance with certain embodiments.

In some systems, the servers cooperate with one another to relay messages from a first server to a last server in an ordered manner. FIG. 10 illustrates a system 1000 in which N servers relay messages from a first server 1010 to a Nth server 1013 in an ordered manner. For example, in system 1000 first server 1010 receives a message for the system from agent device 105 or some other device. The first server 1010 provides the message to second server 1011. Second server 1011 receives the message from first server 1010 and relays the message to a third server. This process is repeated for each server until Nth–1 server 1012 receives the message from a previous server 115 and relays the message to Nth server 1013. In system 1000, the server that processes the messages the slowest creates a bottle neck as the messages cannot be relayed to subsequent servers without passing through the slowest server.

In system 1000, monitoring system 150 is a processing system that communicatively connects via a network or some other connection to the servers 1010-1013 in system 1000 to perform diagnostic functions on the servers and monitor the operational parameters of each server. For example, monitoring system 150 may obtain message processing information from each of the servers 1010-1013 in system 1000 and generate displays showing the message processing information. The message processing information includes information relevant to the processing of messages in each of the servers and may include, but is not limited to, the number of messages processed by the system per a specified period of time.

Figure 11:
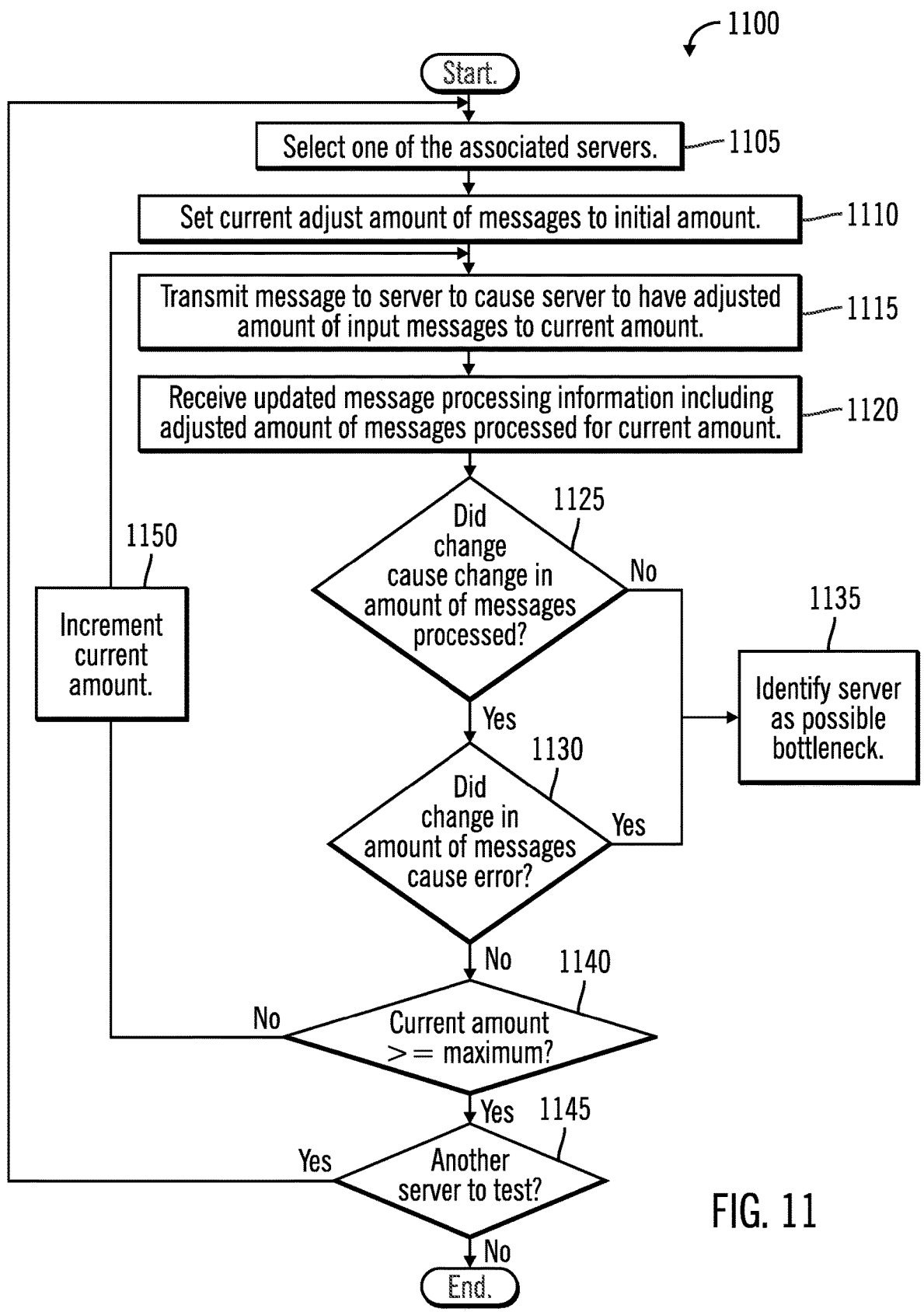
FIG. 11 illustrates, in a flow diagram, a process identifying a server as a potential bottle neck in a group of servers that relay messages from a first server to a last server in an ordered fashion in accordance with certain embodiments.

It may be difficult to identify a server 1010-1013 that causes a bottleneck by simply changing the amount of incoming messages to first server as the amount of incoming messages received by a server that is subsequent in the message flow to a previous server is limited by the message processing of the previous server. To detect a server that may cause a bottle neck in such a system some embodiments provide a process that test each server in the system to identify servers that may cause a potential bottleneck. FIG. 11 illustrates a flow diagram of a process performed by the monitoring system to test each server in a group of servers relaying servers in an ordered manner from a first server to a lest server to detect servers that may cause in accordance with an embodiment of the invention.

In process 1100, a monitoring system 150 selects one of the servers from the group of servers to test. (1105). In some embodiments, a last server is selected first, and, in each iteration, a previous server is selected until a first server is reached. In some other embodiments, a first server in the group may be selected first and, in each iteration, a subsequent server is selected until the last server is reached. In various other embodiments, other manners of selecting the servers in an order sequence is used to select the server.

A current amount of input messages is set to an initial amount (1110). For example, the initial amount may be the lower threshold for a range selected by a user or set at a predetermined number.

A message is transmitted to the server to cause the server to adjust the number of input messages to the current amount of input messages (1115). In some, embodiments the message includes the amount of input messages and the server adjusts the amount of input messages accordingly. In some other embodiments, the monitoring system 150 determines whether the number of messages currently in the input queue needs to be increased or decreased and directs the server accordingly. If the amount of input messages is to be reduced, the monitoring system 150 may send a message that causes the server to re-write a configuration file to discard some messages accordingly in some embodiments. If the amount of input message is to increases, the monitoring system 150 determines the amount of input messages is to be increased and directs the server to generate dummy messages. In some other embodiments, the monitoring system 150 may generate and transmit the dummy messages to the server. In still other embodiments, the monitoring system 150 may direct another device, such as agent device 105, to generate the dummy messages and transmit the generated messages to the server.

In response to sending the message(s) that cause the server to adjust the amount of input messages, the monitoring system 150 receives updated message processing information based on the processing of the current number of incoming messages (1120). The monitoring system 150 determines whether the updated processing information indicates an increase in the current number of messages processed compared to the updated processing information for the previous amount of input messages (1125) or causes an error condition in the server (1130). If either the number of messages processed does not changes as the number of messages increase or an error condition occurs, the server is identified as a possible cause of a bottle neck and indication of the server being a possible bottleneck is presented on a display (1135).

If the amount of message processed does change and/or there is no error condition; or after the indication is provided, the process determines whether the current amount of input messages is greater than or equal to a maximum amount (1140). If the current level is not greater than or equal to a maxim, the current amount of input messages is incremented (1150) and the process is repeated from the transmission of the message (1115). If the current number of messages is not greater than or equal to the maximum amount, the process determines whether there is another server to test. If so, process 1100 repeats from the selection of a server (1105). Otherwise, process 1100 ends.

A process for determining servers in a group of servers that are a potential cause of a bottleneck in a system in accordance with an embodiment is described above with reference to FIG. 11. However, other processes that add, remove, and/or combine steps of the described process are possible in accordance with other embodiments.

The above described process 1100 allows the monitoring system 150 to gradually increase an amount of input to an initial server to test the server individually. This allows to test all of the servers reducing the problem of testing servers that are subsequent to the bottleneck in the message flow.

Figure 12:
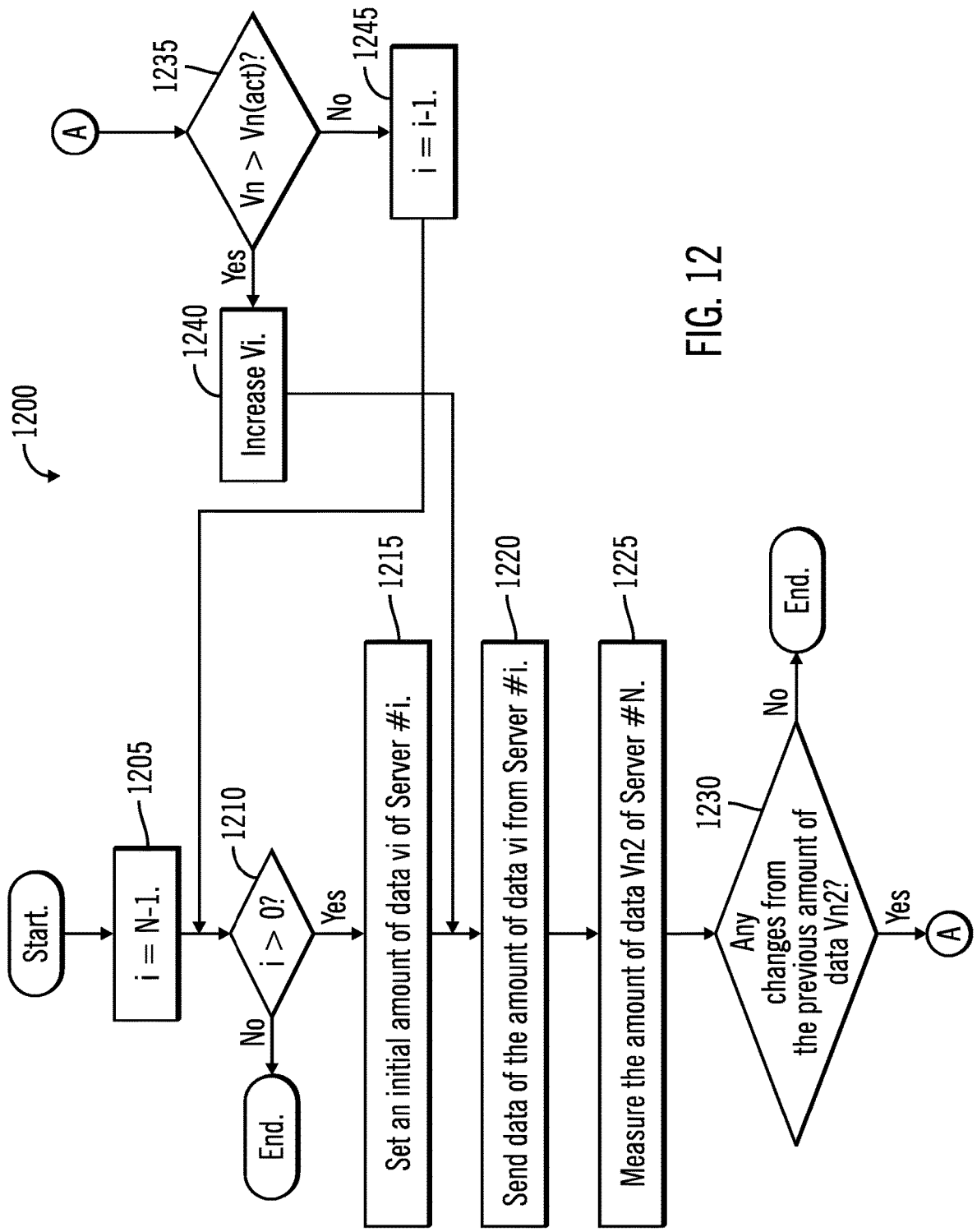
FIG. 12 illustrates, in a flow diagram, a process identifying a server as a potential bottle neck in a group of servers that relay messages from a first server to a last server in an ordered fashion in accordance with some other embodiments.

In accordance with some embodiments, the servers in a system that relay messages from a first server to an Nth or last server are tested individually in an ordered manner starting with the Nth server and ending the first server. FIG. 12 illustrates a process performed by monitoring device in accordance with some of these embodiments.

In process 1200, a counter, i, is set equal to N−1 where N is the number of servers in the system (1205). The process 1200 determines whether the counter, i, is greater than 0 (1210). If the counter, i, is greater less than or equal to 0, the process 1200 ends.

If the counter, i, is greater than 0, a current amount of incoming messages for the server is set to an initial amount, $V_i$. The current amount of incoming messages is sent to the ith server in the group (1220) and a current amount of messages processed, $V_n$, is determined (1225).

The current amount of messages processes, $V_n$, is compared to a previously determined amount of messages processed (1230). If there is no change in the amount of messages processed, the process 1200 ends identifying the current server as the cause of a bottleneck. If the current amount of messages processed changed from the previous amount, the process determines whether all of the incoming messages $V_n$(act) have been processed. If so, the current amount of incoming messages, $V_i$, is increased and process 1200 repeats from sending the current amount of incoming messages to the server. If not, the counter, i, is reduced by 1 to test the server previous to the current server in the message flow and process 1200 repeats from testing the counter (1210).

FIG. 12 illustrates one method performed by a monitoring system 150 to identify servers that may cause a bottleneck in accordance with an embodiment of the invention. Other processes that add, remove, and/or combine the steps discussed above are possible in accordance with some embodiments.

Thus, certain embodiments detect a server being a bottleneck in a plurality of servers by displaying, monitoring and controlling a number of messages flowing through each server. Such embodiments display a number of messages flowing through each of the servers on a monitoring screen, control the number of messages with response to user instructions of increasing and decreasing the number of messages by creating dummy messages and removing messages respectively, and determines a server that is a bottleneck by setting an initial amount of data for a server in a series of servers; transmitting data of the amount of data from the server; measuring an amount of data processed by the server; and when an amount of data processed by the server does not increase even when the amount of data is changed, determining that the server is the bottleneck.

In certain embodiments, once the server causing the bottleneck is identified, machine powers, such as memory and CPU, are upgraded to avoid the bottleneck for additional processing.

Figure 13:
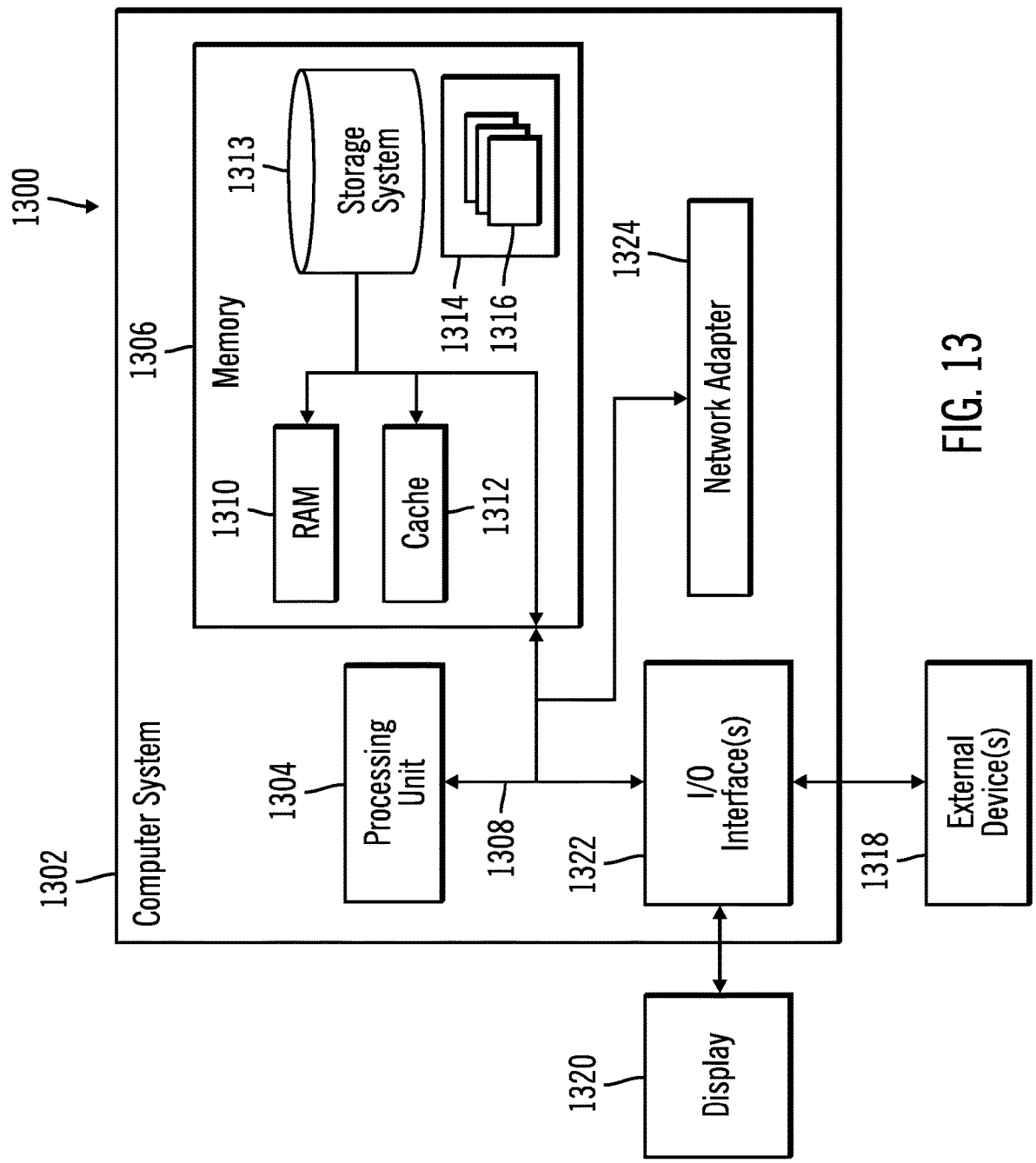
FIG. 13 illustrates, in a block diagram, a computing system in accordance with certain embodiments.

FIG. 13 illustrates a computing environment 1300 in accordance with certain embodiments. Referring to FIG. 13, computer node 1302 is only one example of a suitable computing node and is not intended to suggest any limitation as to the scope of use or functionality of embodiments of the invention described herein. Regardless, computer node 1302 is capable of being implemented and/or performing any of the functionality set forth hereinabove.

The computer node 1302 may be a computer system, which is operational with numerous other general purposes or special purpose computing system environments or configurations. Examples of well-known computing systems, environments, and/or configurations that may be suitable for use with computer node 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1302 may be described in the general context of computer system executable instructions, such as program modules, being executed by a computer system. Generally, program modules may include routines, programs, objects, components, logic, data structures, and so on that perform particular tasks or implement particular abstract data types. Computer node 1302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer node 1302 is shown in the form of a general-purpose computing device. The components of computer node 1302 may include, but are not limited to, one or more processors or processing units 1304, a system memory 1306, and a bus 1308 that couples various system components including system memory 1306 to one or more processors or processing units 1304.

Bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1302 typically includes a variety of computer system readable media. Such media may be any available media that is accessible by computer node 1302, and it includes both volatile and non-volatile media, removable and non-removable media.

System memory 1306 can include computer system readable media in the form of volatile memory, such as random access memory (RAM) 1310 and/or cache memory 1312. Computer node 1302 may further include other removable/non-removable, volatile/non-volatile computer system storage media. By way of example only, storage system 1313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1308 by one or more data media interfaces. As will be further depicted and described below, system memory 1306 may include at least one program product having a set (e.g., at least one) of program modules that are configured to carry out the functions of embodiments of the invention.

Program/utility 1314, having a set (at least one) of program modules 1316, may be stored in system memory 1306 by way of example, and not limitation, as well as an operating system, one or more application programs, other program modules, and program data. Each of the operating system, one or more application programs, other program modules, and program data or some combination thereof, may include an implementation of a networking environment. Program modules 1316 generally carry out the functions and/or methodologies of embodiments of the invention as described herein.

Computer node 1302 may also communicate with one or more external devices 1318 such as a keyboard, a pointing device, a display 1320, etc.; one or more devices that enable a user to interact with computer node 1302; and/or any devices (e.g., network card, modem, etc.) that enable computer node 1302 to communicate with one or more other computing devices. Such communication can occur via Input/Output (I/O) interfaces 1322. Still yet, computer node 1302 can communicate with one or more networks such as a local area network (LAN), a general wide area network (WAN), and/or a public network (e.g., the Internet) via network adapter 1324. As depicted, network adapter 1324 communicates with the other components of computer node 1302 via bus 1308. It should be understood that although not shown, other hardware and/or software components could be used in conjunction with computer node 902. Examples, include, but are not limited to: microcode, device drivers, redundant processing units, external disk drive arrays, RAID systems, tape drives, and data archival storage systems, etc.

In certain embodiments, agent device 105; servers 110, 115, 120, and 125; and/or monitoring system 150 may have the architecture of computer node 1302.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method for identifying a server from a plurality of servers causing a bottleneck in a system comprising:
    providing, on a display, message processing information about message processing performed by one of the plurality of servers, wherein the plurality of servers in the system relay messages in an ordered manner from a first server to a last server;
    receiving an input via an input device from a user indicating an adjustment amount to a number of messages input to the one of the plurality of servers;
    sending a message causing the one of the plurality of servers to adjust a number of input messages in a processing queue based on the adjustment amount of the number of messages;
    receiving updated message processing information for the number of messages in the adjusted number of input messages, wherein the updated message processing information indicates a number of messages processed per unit time; and
    in response to determining that the number of messages processed does not change in response to the adjustment to an amount of messages input, identifying, on the display, that the one of the plurality of servers as causing the bottleneck in the system.

2. The computer-implemented method of claim 1 further comprising:
    determining the number of input messages to the one of the plurality of servers is to increase based on the adjustment amount; and
    wherein the message causes a plurality of dummy messages to be added to the processing queue to increase the number of input messages.

3. The computer-implemented method of claim 2, wherein the message instructs the one of the plurality of servers to generate the plurality of dummy messages.

4. The computer-implemented method of claim 2, wherein the plurality of dummy messages are generated by a remote system and transmitted to the one of the plurality of servers.

5. The computer-implemented method of claim 1, further comprising:
    determining the number of input messages to the one of the plurality of servers is to decrease based on the adjustment amount; and
    wherein the message causes the one of the plurality of servers to discard a plurality of input messages from the processing queue to decrease the number of input messages.

6. The computer-implemented method of claim 5, wherein the message instructs the one of the plurality of servers to change a configuration file to discard input messages in the processing queue.

7. The computer-implemented method of claim 1, wherein updated message processing information for each of the plurality of servers is obtained to allow the updated message processing information for each of the plurality of servers to be used to determine the server causing the bottleneck.

8. The computer-implemented method of claim 7, wherein the one of the plurality of servers is identified as the server causing the bottleneck in response to a determination that a number of messages processed in the updated processing information does not increase as the adjustment amount of input messages increases.

9. The computer-implemented method of claim 7, wherein the one of the plurality of servers is identified as the server causing the bottleneck in response to a determination that an increase in an amount of input messages causes an error in the one of the plurality of servers.

10. The computer-implemented method of claim 7, wherein the updated message processing information for the plurality of servers is determined in a specified order to aid in identifying the server causing the bottleneck.

11. A computer system for identifying a server from a plurality of servers causing a bottleneck in a system, the system comprising one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-implemented memories, to perform operations comprising:
providing, on a display, message processing information about message processing performed by one of the plurality of servers, wherein the plurality of servers in the system relay messages in an ordered manner from a first server to a last server;
receiving an input via an input device from a user indicating an adjustment amount to a number of messages input to the one of the plurality of servers;
sending a message causing the one of the plurality of servers to adjust a number of input messages in a processing queue based on the adjustment amount to the number of messages;
receiving updated message processing information for the number of messages in the adjusted number of input messages wherein the updated message processing information indicates a number of messages processed per unit time; and
in response to determining that the number of messages processed does not change in response to the adjustment to the amount of messages input, identifying, on the display, that the one of the plurality of servers as causing the bottleneck in the system.

12. The computer system of claim 11, wherein the operations further comprise:
determining the number of input messages to the one of the plurality of servers is to increase based on the adjustment amount; and
wherein the message causes a plurality of dummy messages to be added to the processing queue to increase the number of input messages.

13. The computer system of claim 12, wherein the message instructs the one of the plurality of servers to generate the plurality of dummy messages.

14. The computer system of claim 13, wherein the plurality of dummy messages are generated by a remote system and transmitted to the one of the plurality of servers.

15. The computer system of claim 11, wherein the operations further comprise:
determining the number of input messages to the one of the plurality of servers is to decrease based on the adjustment amount; and
wherein the message causes the one of the plurality of servers to discard a plurality of input messages from the processing queue to decrease the number of input messages.

16. The computer system of claim 11, wherein updated message processing information for each of the plurality of servers is obtained to allow the updated message processing information for each of the plurality of servers to be used to determine the server causing the bottleneck.

17. A computer program product for identifying a server from a plurality of servers causing a bottleneck in a system, the computer program product comprising a computer readable storage medium having program code embodied therewith, the program code executable by at least one processor to perform operations, the operations comprising:
providing, on a display, message processing information about message processing performed by one of the plurality of servers, wherein the plurality of servers in the system relay messages in an ordered manner from a first server to a last server;
receiving an input via an input device from a user indicating an adjustment amount to a number of messages input to the one of the plurality of servers;
sending a message causing the one of the plurality of servers to adjust a number of input messages in a processing queue based on the adjustment amount to the number of messages;
receiving updated message processing information for the number of messages in the adjusted number of input messages wherein the updated message processing information indicates a number of messages processed per unit time; and
in response to determining that the number of messages processed does not change in response to the adjustment to the amount of messages input, identifying, on the display, that the one of the plurality of servers as causing the bottleneck in the system.

18. The computer program product of claim 17, wherein the operations further comprise:
determining the number of input messages to the one of the plurality of servers is to increase based on the adjustment amount; and
wherein the message causes a plurality of dummy messages to be added to the processing queue to increase the number of input messages.

19. The computer program product of claim 18, wherein the message instructs the one of the plurality of servers to generate the plurality of dummy messages.

20. The computer program product of claim 17 wherein the operations further comprise:
determining the number of input messages to the one of the plurality of servers is to decrease based on the adjustment amount; and
wherein the message causes the one of the plurality of servers to discard a plurality of input messages from the processing queue to decrease the number of input messages.

* * * * *